Sept. 24, 1946. T. R. SMITH 2,408,006
HYDRAULIC VALVE CONSTRUCTION
Filed Dec. 17, 1943
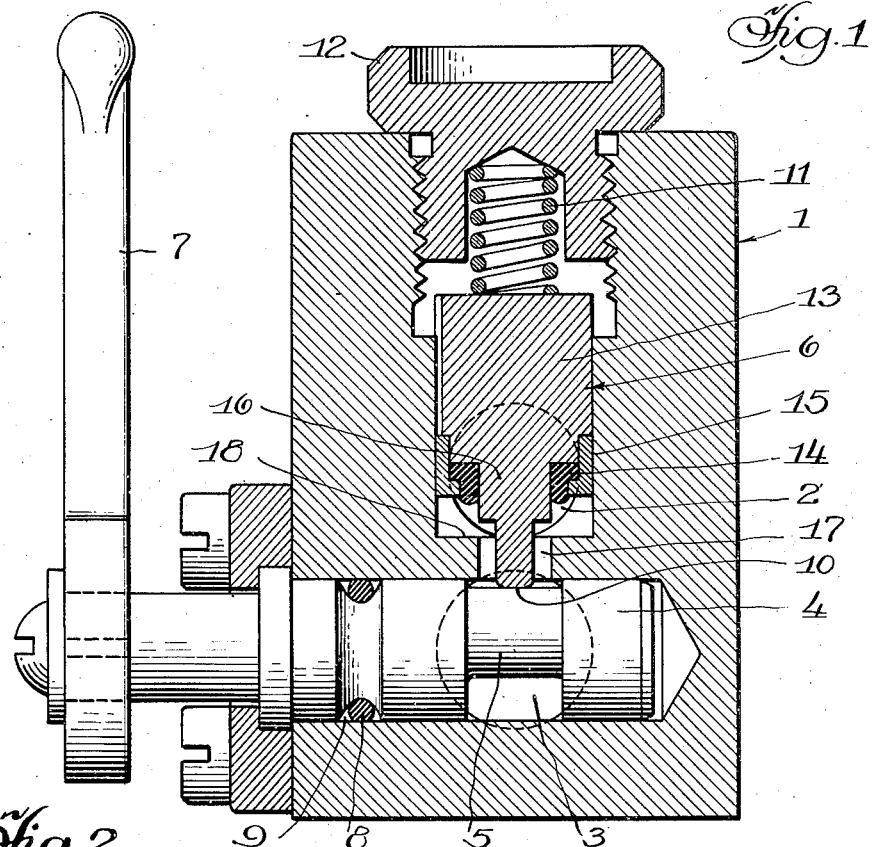
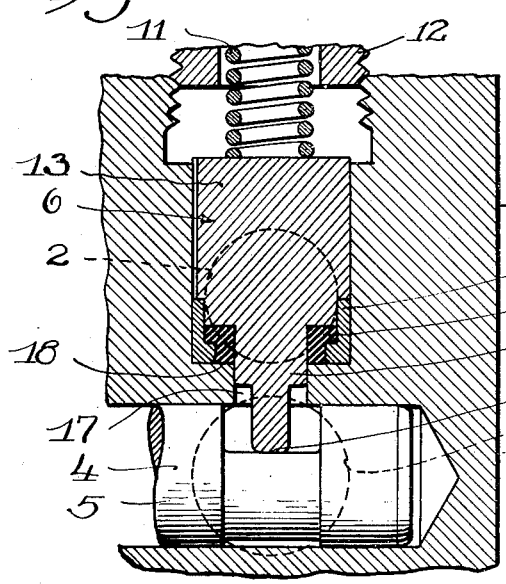
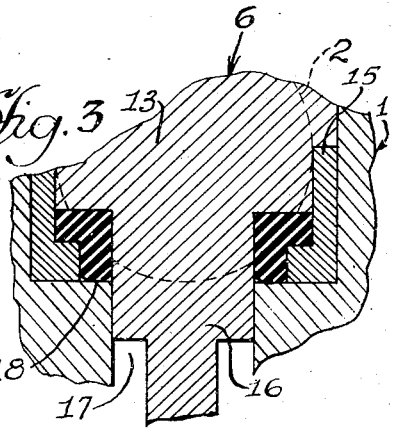
INVENTOR.
Thomas R. Smith.
BY
Parkinson & Lane
Attys Patented Sept. 24, 1946

2,408,006

UNITED STATES PATENT OFFICE 2,408,006

HYDRAULIC VALVE CONSTRUCTION

Thomas R. Smith, Newton, Iowa, assignor to The Maytag Company, Newton, Iowa, a corporation of Delaware Application December 17, 1943, Serial No. 514,645

5 Claims. (Cl. 251—27)

The present invention relates to hydraulic valve constructions and especially to a novel valve assembly and valve seat seal particularly adapted for use in hydraulic systems where the pressure encountered is relatively high.

Among the objects of the present invention is the provision of a novel valve assembly including a valve plunger carrying a resilient seal, the plunger being so contoured as to substantially close or restrict the flow of hydraulic fluid through the valve seat prior to closing of the valve and seating of the resilient seal against the valve seat to thereby completely seal off any further flow of fluid. When the valve is moved to open position, the plunger first lifts the resilient seal from its seating engagement with the valve seat and then removes the plunger from the position in which it substantially restricts the flow through the valve seat, thereby fully opening the valve for uninterrupted passage of the hydraulic fluid.

The present invention further comprehends a novel valve plunger so constructed and arranged that when the handle is moved to close the valve, this plunger is automatically lowered to first restrict the flow of hydraulic fluid through the valve seat, and then to completely close off the flow of fluid through the valve body.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is an enlarged view in vertical cross section through the novel valve construction, the valve assembly being shown in open or raised position.

Figure 2 is a fragmentary view in vertical cross section similar to Figure 1 but showing the valve assembly in closed or lowered position.

Figure 3 is a fragmentary enlarged view in vertical cross section similar to Figure 2 but more clearly showing the sealing ring in closed position.

Referring more particularly to the illustrative embodiment shown in the drawing, the novel invention therein disclosed comprises a valve assembly including a body or housing 1 having an inlet 2 and a discharge outlet 3. The valve is actuated by a cam shaft 4 having an eccentric cam surface 5 for elevating a valve plunger 6. The cam shaft may be rotated through any suitable mechanism such as a handle or the like 7. A resilient sealing ring 8 positioned within a substantially V-shaped annular recess 9 in the circumference of the shaft, seals against the journaled surface in the valve body or housing 1 and prevents leakage about the shaft.

When the handle 7 is moved to the position shown in Figure 1, the plunger 6 is raised by engagement of the eccentric cam surface 5 with the lower end 10 of the plunger. As the cam rotates the plunger moves up and down against the pressure of a spring 11 held in place by means of a threaded plug 12 hollowed out to receive the upper end of the spring.

As will be clearly apparent from the drawing, the upper enlarged end 13 of this plunger slides conformably within the bore of the valve body and carries a resilient sealing member or ring 14 held in place by a press ring 15. This sealing ring 14 is so disposed as to encompass the upper end of the stepped or reduced portion 16 of the plunger, the diameter of which is such that the part disposed below or beyond the sealing ring may enter and substantially restrict the opening or passage 17 in the valve seat 18, as clearly shown in Figure 2.

From the above description and the disclosure in the drawing, it will be apparent that by restricting the passage of the hydraulic fluid through the opening or passage 17, when the resilient sealing ring is moved into seating engagement with the valve seat or is withdrawn therefrom, the possibility of extrusion of the material of the sealing ring into the opening between the plunger and valve seat 18 is entirely eliminated. This permits the use of a sealing ring of natural or compounded synthetic rubber and assures most effective sealing regardless of the pressure of the hydraulic fluid.

Furthermore, as the resilient sealing ring extends below the lower surface of the metal press ring 15 and therefore contacts the valve seat ahead of any metal contact of this ring with the valve seat, complete sealing is accomplished even though the metal parts are held in a slight distance apart by dirt or other foreign particles.

Having thus disclosed the invention, I claim:

1. In a valve construction, a valve body having an inlet for hydraulic fluid under pressure and a flat valve seat provided with an outlet for passage of the fluid, a valve plunger longitudinally movable in the body and provided with a reduced part with a portion thereof conforming to and adapted to enter the outlet to substantially restrict the flow of fluid therethrough when the plunger is moved toward closed position, a resilient sealing ring carried by the plunger and provided with an annular flexible sealing lip adapted to contact and seal against the seat after the reduced part enters the outlet, a part encompassing the sealing ring and providing a stop adapted to engage the seat after the sealing lip contacts therewith and means for moving the plunger to operate the valve.

2. In a valve construction, a valve body having an inlet for hydraulic fluid and a flat valve seat provided with an outlet for passage of the fluid, a valve plunger slidably mounted in the body and provided with a part adapted to enter and fit conformably within the outlet to substantially restrict the flow therethrough when the plunger is moved toward closed position, a resilient sealing ring mounted upon the plunger and provided with a depending sealing lip adapted to contact and seal against the seat after the part enters the outlet to thereby completely close and seal off any further flow therethrough, a retaining ring carried by the plunger for anchoring the sealing ring upon the plunger and having an annular surface providing a stop adapted to contact the seat after the sealing lip engages therewith, and means for moving the plunger and sealing lip into sealing engagement with the seat.

3. In a sealing construction adapted to prevent a fluid from passing through an outlet, a plunger provided with a reduced part adapted to enter and fit conformably within the outlet to substantially restrict the flow therethrough when the plunger is moved toward the closed position, a resilient sealing ring mounted upon the reduced part and provided with a depending flexible sealing lip adapted to contact and seal against the surface around the outlet after the reduced part enters the outlet to thereby completely close and seal off any further flow therethrough, and a part encompassing the sealing ring and providing a stop adapted to engage the surface surrounding the outlet after the sealing lip contacts therewith.

4. In a sealing construction adapted to prevent a fluid from passing through an outlet, a flat seat encompassing the outlet, a plunger provided with a reduced part adapted to enter and fit conformably within the outlet to substantially restrict the flow therethrough when the plunger is moved toward the closed position, a resilient sealing ring mounted upon the reduced part and provided with a depending flexible sealing lip adapted to contact and seal against a flat surface around the outlet after the reduced part enters the outlet to thereby completely close and seal off any further flow therethrough, and a part encompassing the sealing ring and providing a stop adapted to engage the flat surface surrounding the outlet after the sealing lip contacts therewith.

5. In a sealing construction adapted to prevent a fluid from passing through an outlet, a plunger provided on the pressure side of the outlet with a portion adapted to enter and fit conformably within the outlet to substantially restrict the flow therethrough when the plunger is moved toward the closed position, a resilient sealing ring mounted on said portion and provided with a depending flexible sealing lip adapted to contact and seal against the surface around the outlet after said portion enters the outlet to thereby completely close and seal off any further flow therethrough, and a stop provided on the plunger for stopping movement of the plunger after the sealing lip has contacted the surface around the outlet.

THOMAS R. SMITH.